US012638953B2

(12) United States Patent
Kong et al.

(10) Patent No.: US 12,638,953 B2
(45) Date of Patent: May 26, 2026

(54) METHOD FOR DISPLAYING SIDEBAR, TERMINAL AND STORAGE MEDIUM

(71) Applicant: GUANGDONG OPPO MOBILE TELECOMMUNICATIONS CORP., LTD., Dongguan (CN)

(72) Inventors: Fanxiu Kong, Dongguan (CN); Han Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 273 days.

(21) Appl. No.: 18/380,949

(22) Filed: Oct. 17, 2023

(65) Prior Publication Data

US 2024/0045570 A1 Feb. 8, 2024

Related U.S. Application Data

(63) Continuation of application No. PCT/CN2022/077701, filed on Feb. 24, 2022.

(30) Foreign Application Priority Data

Apr. 19, 2021 (CN) .......................... 202110421089.9

(51) Int. Cl.
*G06F 3/0482* (2013.01)
*G06F 3/0488* (2022.01)
*G06F 3/16* (2006.01)

(52) U.S. Cl.
CPC .......... *G06F 3/0482* (2013.01); *G06F 3/0488* (2013.01); *G06F 3/167* (2013.01)

(58) Field of Classification Search
CPC ....... G06F 3/0482; G06F 3/0488; G06F 3/167
See application file for complete search history.

(56) References Cited

U.S. PATENT DOCUMENTS 7,434,177 B1 * 10/2008 Ording ................ G06F 3/04842
345/157
2007/0198946 A1 8/2007 Viji et al.
(Continued)

FOREIGN PATENT DOCUMENTS

CN 103635901 A 3/2014
CN 104102445 A 10/2014
(Continued)

OTHER PUBLICATIONS

CNIPA, First Office Action for CN Application No. 202110421089.9, Mar. 14, 2024.
(Continued)

*Primary Examiner* — Seth A Silverman
(74) *Attorney, Agent, or Firm* — Sheppard, Mullin, Richter & Hampton LLP

(57) ABSTRACT

Provided are a method for displaying a sidebar, and a terminal and a non-transitory storage medium. A first graphical user interface of a first application is displayed. A system sidebar is displayed in an edge area of a display screen of a terminal, and to-be-processed data recommended for the first application is displayed in the system sidebar. In response to a trigger operation performed on the to-be-processed data, a second graphical user interface of the first application is displayed, and the second graphical user interface is an interface for processing the to-be-processed data.

20 Claims, 10 Drawing Sheets

(56) References Cited

U.S. PATENT DOCUMENTS

| 2008/0120569 | A1* | 5/2008 | Mann | G06F 3/0481 |
| | | | | 715/792 |
| 2013/0227470 | A1* | 8/2013 | Thorsander | G06F 3/0482 |
| | | | | 715/790 |
| 2014/0026099 | A1* | 1/2014 | Andersson Reimer | .................... |
| | | | | G06F 3/0482 |
| | | | | 715/825 |
| 2015/0074585 | A1* | 3/2015 | Lee | G06F 3/04842 |
| | | | | 715/773 |
| 2018/0335936 | A1* | 11/2018 | Missig | G06F 3/0482 |

FOREIGN PATENT DOCUMENTS

| CN | 108874485 | A | 11/2018 |
| CN | 109062475 | A | 12/2018 |
| CN | 109144649 | A | 1/2019 |
| CN | 109164964 | A | 1/2019 |
| CN | 109246464 | A | 1/2019 |
| CN | 109684526 | A | 4/2019 |
| CN | 110113483 | A | 8/2019 |
| CN | 110611733 | A | 12/2019 |
| CN | 111147790 | A | 5/2020 |
| CN | 112416223 | A | 2/2021 |

OTHER PUBLICATIONS

"No plugin needed! App can open the [drawing still draw], comes with Jingdong price comparison, what is ColorOS 11 can not do?", APPSO, baijiahao.baidu.com/s?id=1679162023552377235&wfr=spider&for=pc, pp. 1-11, Sep. 29, 2020.

CNIPA, Second Office Action for CN Application No. 202110421089.9, Aug. 3, 2024.

WIPO, International Search Report for PCT Application No. PCT/CN2022/077701, Apr. 28, 2022.

* cited by examiner

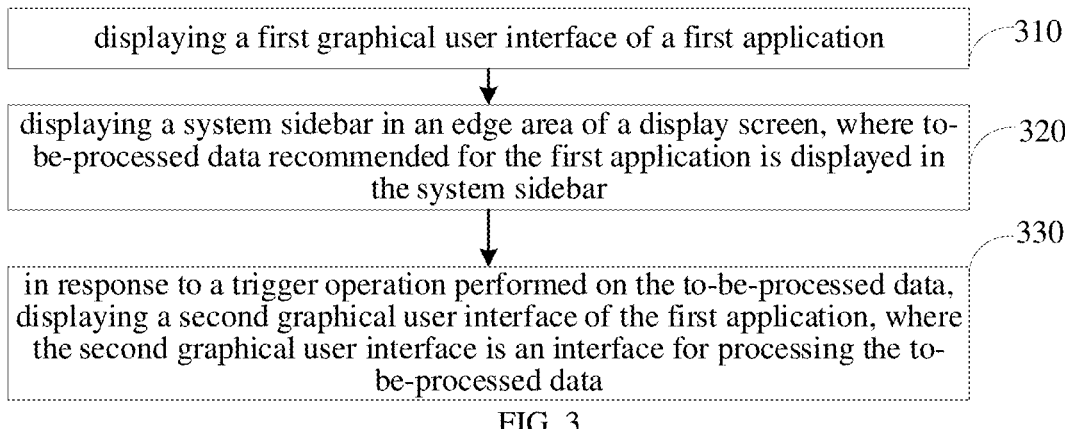

displaying a first graphical user interface of a first application — 310 displaying a system sidebar in an edge area of a display screen, where to-be-processed data recommended for the first application is displayed in the system sidebar — 320

— 330 in response to a trigger operation performed on the to-be-processed data, displaying a second graphical user interface of the first application, where the second graphical user interface is an interface for processing the to-be-processed data

FIG. 3

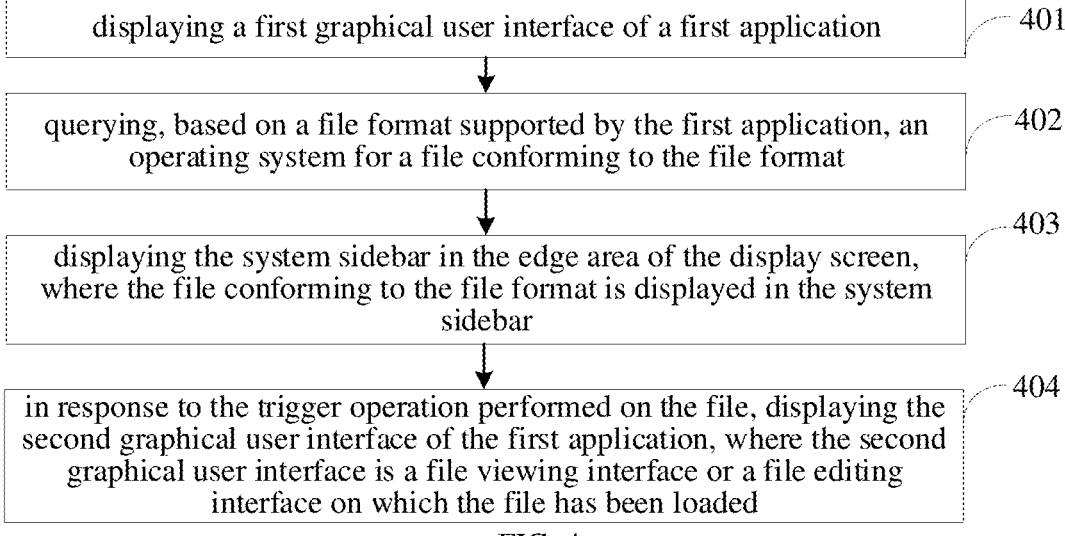

displaying a first graphical user interface of a first application — 401 querying, based on a file format supported by the first application, an operating system for a file conforming to the file format — 402

— 403 displaying the system sidebar in the edge area of the display screen, where the file conforming to the file format is displayed in the system sidebar

— 404 in response to the trigger operation performed on the file, displaying the second graphical user interface of the first application, where the second graphical user interface is a file viewing interface or a file editing interface on which the file has been loaded

FIG. 4

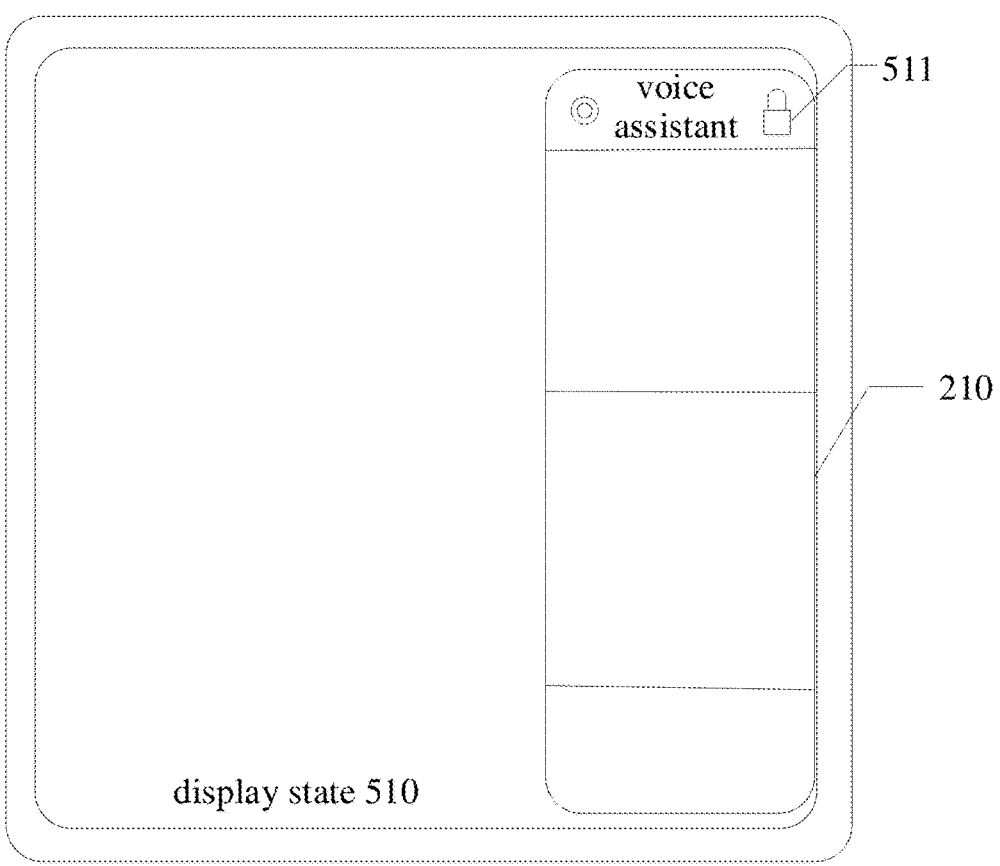
display state 510
511
210
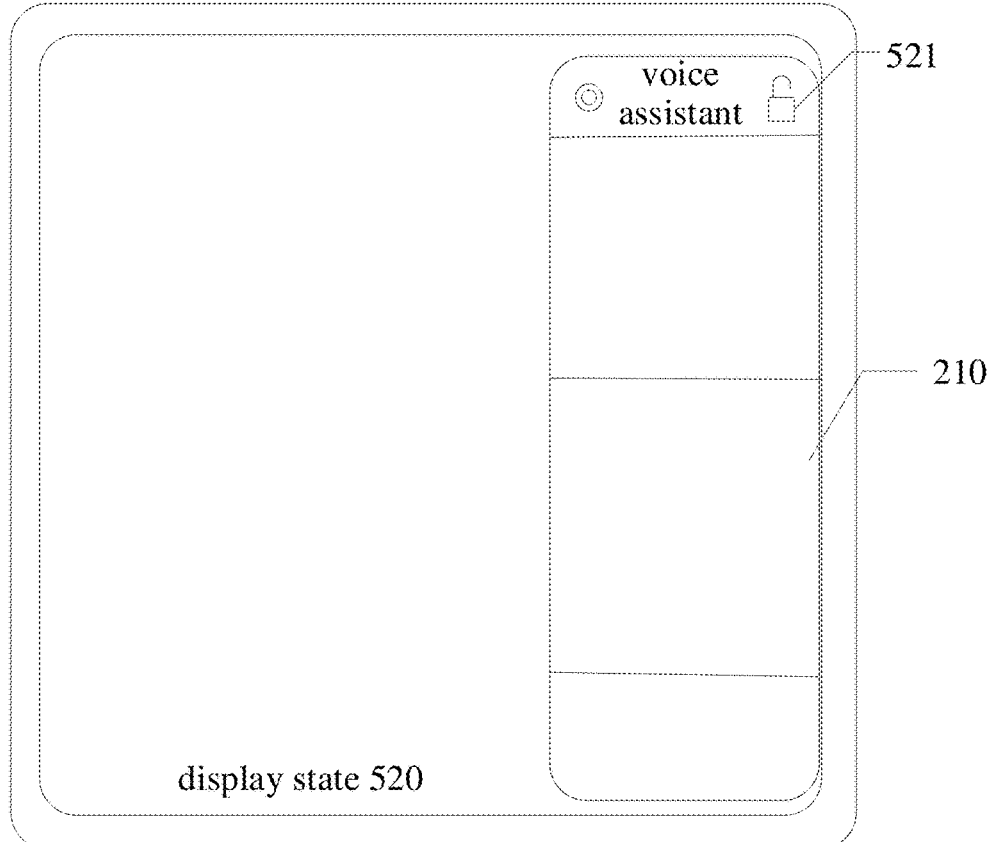
display state 520
521
210
FIG. 5

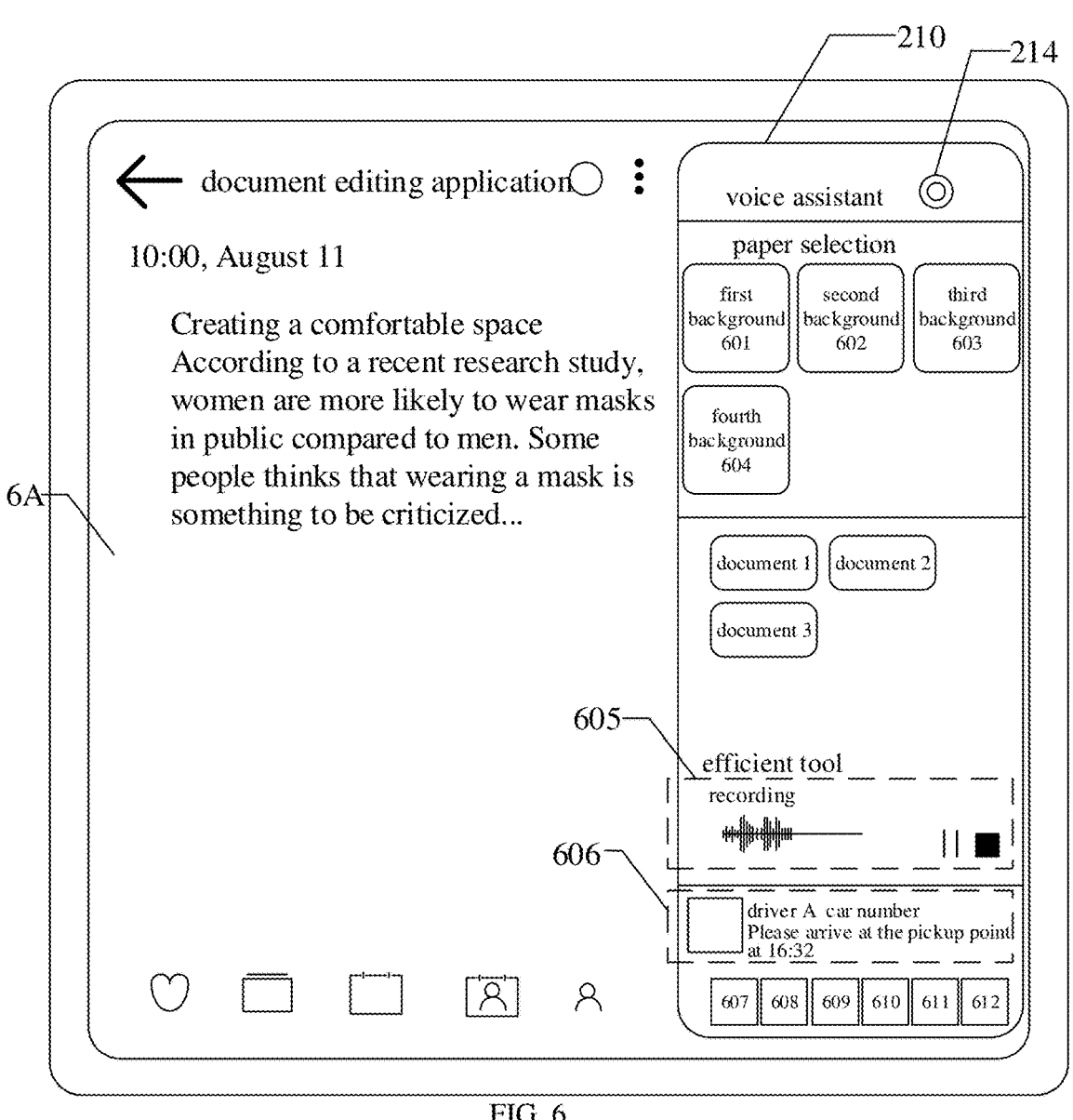

FIG. 6

| displaying a first graphical user interface of a first application | 701 |

↓

| querying, based on a coded format supported by the first application, a clipboard for a character string conforming to the coded format | 702 |

↓

| displaying the system sidebar in the edge area of the display screen, where the character string conforming to the coded format is displayed in the system sidebar | 703 |

↓

| in response to the trigger operation performed on the character string, displaying the second graphical user interface of the first application, where the second graphical user interface is a user interface obtained by parsing and processing information carried in the character string | 704 |

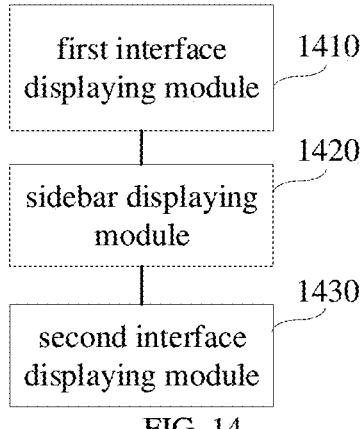

photo news　dress up　prop　competition

A duck is lost.
Go find it!

friend 2's duck friend 1's duck friend　　get feed　　favorite　　　　30g voice assistant two-dimensional code collect/pay refresh hide contact 1　contact 2　contact 3　contact 4　contact 5 my applet applet 1　applet 2　applet 3　applet 4 applet 5　applet 6　applet 7 driver name　car number
Please arrive at the pickup
point at 16:32 applications recently used

FIG. 13 first interface
displaying module　　1410 sidebar displaying
module　　1420 second interface
displaying module　　1430

FIG. 14

METHOD FOR DISPLAYING SIDEBAR, TERMINAL AND STORAGE MEDIUM

CROSS-REFERENCE OF RELATED APPLICATIONS

This application is a continuation of International Application No. PCT/CN2022/077701, filed on Feb. 24, 2022, which claims priority to Chinese Patent Application No. 202110421089.9, filed on Apr. 19, 2021, both of which are hereby incorporated by reference in their entireties.

TECHNICAL FIELD

Embodiments of the disclosure relate to the technical field of computer technologies, and particularly to a method for displaying a sidebar, a terminal and a non-transitory storage medium.

BACKGROUND

A system sidebar is a control container provided by an operating system of a mobile terminal. The system sidebar may be used to display a navigation button or icons of applications frequently used by a user.

In the related art, an icon of a social application may be arranged in the system sidebar. When a user is playing a game or watching a video on full screen, the user can reply to a message in a floating window by clicking the icon of the social application in the system sidebar.

SUMMARY

The embodiments of the disclosure provide a method for displaying a sidebar, a terminal, and a non-transitory storage medium. Technical solutions are as follows.

According to an aspect of the disclosure, a method for displaying a sidebar is provided. The method is implemented by a terminal. The method includes:

displaying a first graphical user interface of a first application on a display screen of the terminal;

displaying a system sidebar in an edge area of the display screen, with to-be-processed data recommended for the first application being displayed in the system sidebar; and in response to a trigger operation performed on the to-be-processed data, displaying a second graphical user interface of the first application, where the second graphical user interface is an interface for processing the to-be-processed data.

According to yet another aspect, a terminal is provided. The terminal includes a processor and a memory. The memory stores at least one instruction which, when being loaded and executed by the processor, cause the method for displaying a sidebar according to the various aspects of the disclosure to be implemented. In some embodiments, the method includes operations as follows. A first graphical user interface of a first application is displayed on a display screen of the terminal, and to-be-processed data recommended for the first application is displayed in a system sidebar on the display screen. In response to a trigger operation performed on the to-be-processed data, a second graphical user interface of the first application is displayed, in which the second graphical user interface is an interface for processing the to-be-processed data.

According to still another aspect, a non-transitory computer-readable storage medium is provided. The storage medium stores at least one instruction which, when being loaded and executed by a processor, causes the method for displaying a sidebar according to the various aspects of the disclosure to be implemented. In some embodiments, the method includes operations as follows. Both of a first graphical user interface of a first application and a system sidebar are displayed on a display screen of an electronic device, to-be-processed data recommended for the first application is displayed in the system sidebar. In response to a trigger operation performed on the to-be-processed data, a second graphical user interface of the first application is displayed, in which the second graphical user interface is an interface for processing the to-be-processed data.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly illustrate technical solutions in the embodiments of the present disclosure, drawings to be used in the embodiments are briefly described below. Apparently, the following drawings are merely some embodiments of the present disclosure, and those skilled in the art can obtain other drawings according to these figures without paying any creative effort.

FIG. 3 is a schematic flowchart of a method for displaying a sidebar according to some exemplary embodiments of the disclosure.

FIG. 4 is another schematic flowchart of the method for displaying a sidebar according to some exemplary embodiments of the disclosure.

FIG. 5 is a schematic diagram illustrating displaying of a system sidebar based on the embodiments illustrated in FIG. 4.

FIG. 6 illustrates a user interface on which a document editing application and a sidebar are simultaneously displayed according to some embodiments of the disclosure.

FIG. 7 is yet another schematic flowchart of the method for displaying a sidebar according to some exemplary embodiments of the disclosure.

FIG. 13 illustrates a user interface on which an in-app game provided by the financial management application and the system sidebar are simultaneously displayed according to some embodiments of the disclosure.

FIG. 14 is a structural block diagram of an apparatus for displaying a sidebar according to some embodiments of the disclosure.

DETAILED DESCRIPTION OF PREFERRED EMBODIMENTS

In order to make the objectives, technical schemes, and advantages of the disclosure clearer, implementations of the disclosure will be described in detail with reference to the drawings.

It is notable that the use of personally identifiable information should follow privacy policies and practices that are generally recognized as meeting or exceeding industry or governmental requirements for maintaining the privacy of users. In particular, the nature of authorized use should be clearly indicated to users in the process of managing and handling the personally identifiable information, so as to minimize risks of unintentional or unauthorized access or use.

Exemplarily, the method for displaying a sidebar in the exemplary embodiments of the disclosure may be applied to a terminal, where such terminal is equipped with a display screen and has a function of displaying a sidebar. The Terminal may include a mobile phone, a tablet computer, a laptop computer, a desktop computer, an all-in-one computer, a server, a workstation, a TV, a set-top box, smart glasses, a smart watch, a player of digital camera, a moving picture experts group audio layer IV (MP4), a player of moving picture experts group audio layer V (MP5), a learning tool, a click-reading terminal, an electronic paper book, an electronic dictionary, a vehicle-mounted terminal, a virtual reality (VR) playback terminal or an augmented reality (AR) playback terminal and the like.

Figures 1, 2:
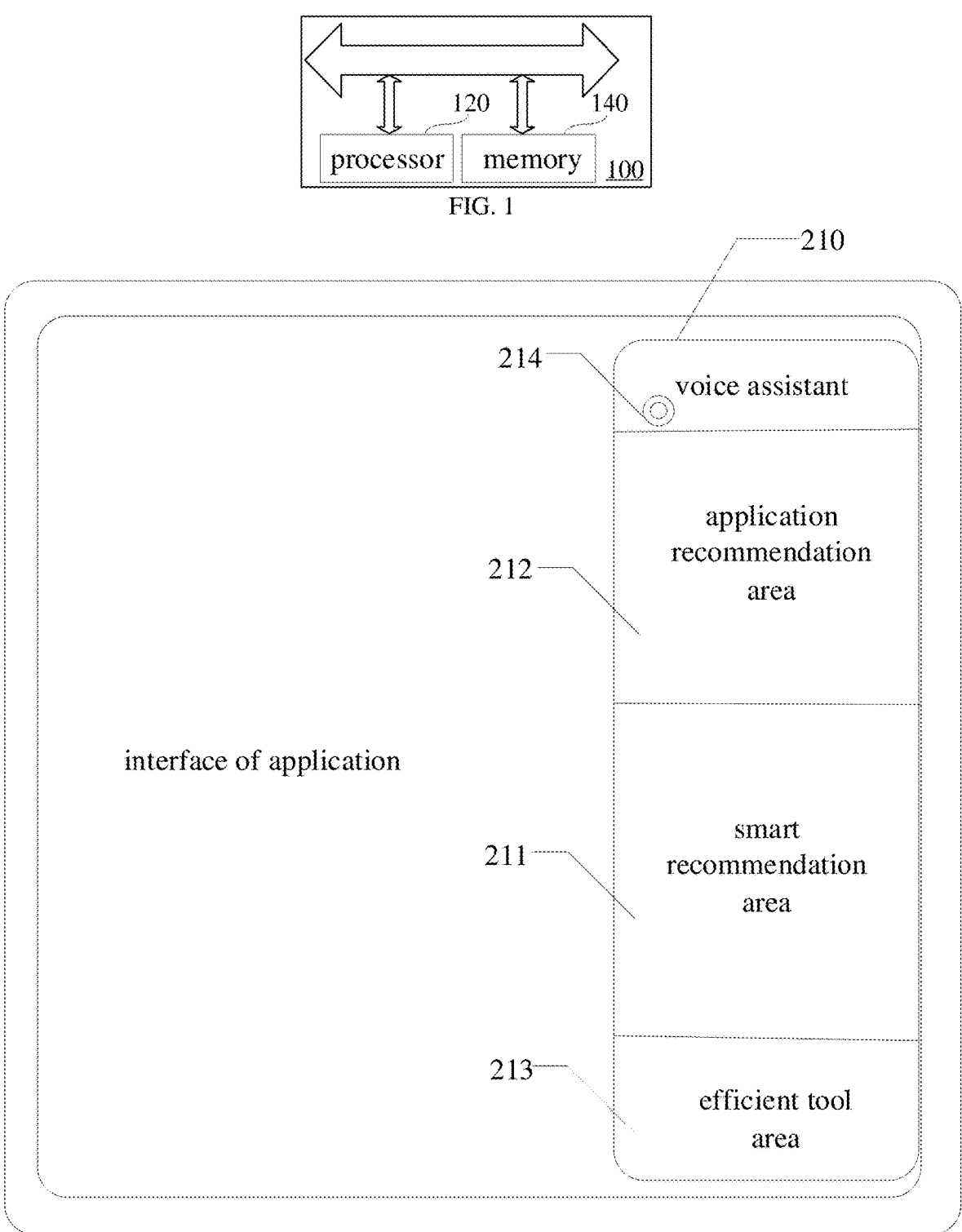
FIG. 1 is a structural block diagram of a terminal according to some exemplary embodiments of the disclosure.
FIG. 2 is a schematic diagram illustrating a system sidebar according to some exemplary embodiments of the disclosure.

Referring to FIG. 1, FIG. 1 is a structural block diagram of a terminal according to some exemplary embodiments of the disclosure. As illustrated in FIG. 1, the terminal includes a processor 120 and a memory 140. The memory 140 stores at least one instruction which, when being loaded and executed by the processor 120, causes the processor 120 to implement the method for displaying a sidebar according to the various method embodiments of the disclosure.

In the exemplary embodiments of the disclosure, the terminal 100 is configured to: display a first graphical user interface of a first application; display a system sidebar in an edge area of the display screen, with to-be-processed data recommended for the first application being displayed in the system sidebar; and in response to a trigger operation performed on the to-be-processed data, display a second graphical user interface of the first application, where the second graphical user interface is an interface for processing the to-be-processed data.

The processor 120 may include one or more processing cores. The processor 120 may be connected to various parts of the entire terminal 100 by using various interfaces and lines, and execute various functions of the terminal 100 and process data by running or executing instructions, programs, code sets, or instruction sets stored in the memory 140, and calling data stored in the memory 140. In some implementations, the processor 120 may be implemented in at least one hardware of a digital signal processing (DSP), a field-programmable gate array (FPGA), and a programmable logic array (PLA). The processor 120 may integrate one or more of a central processing unit (CPU), a graphics processing unit (GPU), and a modem. The CPU mainly handles an operating system, a user interface, an application, or the like. The GPU is configured to render and draw the content required to be displayed by the display screen. The modem is configured to handle a wireless communication. It can be understood that the modem may also not be integrated into the processor 120 and be realized by a single chip The memory 140 may include a random access memory (RAM), and may also include a read-only memory (ROM). In some implementations, the memory 140 may include a non-transitory computer-readable storage medium. The memory 140 may be configured to store instructions, programs, codes, code sets, or instruction sets. The memory 140 may include a program storage area and a data storage area. The program storage area may store instructions for implementing the operating system, instructions for realizing at least one function (such as a touch control function, a voice playing function, and an image playing function), instructions for implementing the following method embodiments, etc. The data storage area may store data involved in the following method embodiments.

Referring to FIG. 2, FIG. 2 is a schematic diagram illustrating a system sidebar according to some exemplary embodiments of the disclosure. As a possible display manner illustrated in FIG. 2, the system sidebar 210 includes a smart recommendation area 211. The to-be-processed data is displayed in the smart recommendation area 211.

In some implementations, the system sidebar 210 may also include both the smart recommendation area 211 and an application recommendation area 212. The application recommendation area 212 is used to display an in-app object. The in-app object is a control or information originally displayed in a certain graphical user interface of the first application.

In some implementations, the system sidebar 210 may also include both the smart recommendation area 211 and an efficient tool area 213. The efficient tool area 213 is used to display service progress information, where the service progress information is used to indicate a status of a service in progress and the service progress information is dynamically updated.

In some implementations, the system sidebar 210 may also include both the smart recommendation area 211 and a voice assistant button 214. The voice assistant button 214 is used to initiate a voice assistant when being triggered. The voice assistant is capable of performing interaction with the user interface by voice, so that the user can control the terminal through voice.

Based on the above possible solutions, the system sidebar 210 may also include all of the smart recommendation area 211, the application recommendation area 212, the efficient tool area 213 and the voice assistant button 214.

Considering the above possible display manners of the system sidebar 210, the system sidebar 210 may either display the smart recommendation area 211 alone, or display the smart recommendation area 211 along with other contents. Specifically, the other contents may be at least one of the application recommendation are 212, the efficient tool area 213, or the voice assistant button 214.

Exemplarily, the specifically displayed one or more of the areas/buttons may be determined based on a type of the first application. For example, the terminal pre-determines correspondences between types of applications and sidebar layouts. When the interface of the first application is displayed, the terminal acquires an application identifier of the first application, and displays the sidebar with the corresponding layout. The terminal may also learn user's usage habits, and adjust the contents displayed in the sidebar according to the user's usage habits. Furthermore, a user may also manually edit the contents displayed in each area of the sidebar, according to the user's preference. In some embodiments, the layout of various areas of the sidebar may also be determined based on the first graphical user interface. For example, different sidebar layouts are displayed for different interfaces of the same application, so as to further improve an efficiency of interaction between the user and the terminal.

In some implementations, when the terminal pre-determines the correspondences between the types of applications and the sidebar layouts, the correspondence may be stored locally or in a cloud server. It is notable that, the correspondence may be a corresponding relationship among the identifier of an application, the type of the application, and the sidebar layout. For example, the correspondence may be illustrated in Table 1.

having a UI. When the terminal runs the first application, the terminal would display the first graphical user interface of the first application.

In some implementations, the first graphical user interface may be a main interface of the first application or a sub-interface of the first application.

In some other implementations, the first graphical user interface may be an interface displaying static contents or playing dynamic contents.

At operation 320, a system sidebar is displayed in an edge area of the display screen, with to-be-processed data recommended for the first application being displayed in the system sidebar.

In the exemplary embodiments of the disclosure, the system sidebar may be displayed in response to an instruction of a user's call-out operation. In practice, when the user performs the call-out operation, a call-out instruction is

TABLE 1

| Identifier of the application | happychat.apk | Tuchat.apk | ABfight.apk | maishop.apk | Feisubrowser.apk |
|---|---|---|---|---|---|
| Application type | social chat | social chat | game | shopping | browser |
| Sidebar layout | layout 1 | layout 1 | layout 2 | layout 3 | layout 4 |

As can be seen from Table 1, the terminal may store a table of correspondences in advance. When the terminal acquires the identifier of the first application, that is, a name of an installation package in Table 1, the terminal may know the type of the first application. In addition, the terminal may further acquire the sidebar layout corresponding to the first application. In the example shown in Table 1, the same application type corresponds to the same sidebar layout. For example, two different social chat types, i.e., happychat.apk and Tuchat.apk, have the same sidebar layout, i.e., layout 1.

In some exemplary embodiments of the disclosure, configuration parameters required for the different layouts may be pre-stored in the terminal.

In some implementations, with regard to the same first application, the contents displayed in the sidebar layout may also change accordingly depending on different users. For example, the terminal may record contents frequently used in the sidebar, and then adjust the sidebar layout according to a frequency of use. For example, a display size of an area that has a high frequency of use is increased, and a display size of an area that has a low frequency of use is reduced. Alternatively, for the same display area, the control that has a high frequency of use is displayed in the front, and the control that has a low frequency of use is displayed at the back.

In some implementations, the sidebar may also enter an editing mode. When the sidebar is in the editing mode, the user may manually adjust the display size of each area and/or a display order of various controls in the sidebar according to the user's need.

Referring to FIG. 3, FIG. 3 is a schematic flowchart of a method for displaying a sidebar according to some exemplary embodiments of the disclosure. The method for displaying a sidebar may be applied to the above described terminal. In FIG. 3, the method for displaying a sidebar includes operations as follows.

At operation 310, a first graphical user interface of a first application is displayed.

In the exemplary embodiments of the disclosure, the terminal is equipped with a display screen, and is capable of displaying a user interface (UI) on the display screen. The terminal may be installed with and execute applications triggered in the terminal, where the call-out instruction instructs the terminal to display the system sidebar.

In some implementations, a human-computer interaction operation between the user and the terminal may the trigger the call-out instruction. Specifically, the human-computer interaction operation may include any one or more of a touch operation, a gesture, and a voice.

In some implementations, when the human-computer interaction operation is the touch operation, the touch operation includes, but is not limited to, a clicking operation, a long-pressing operation, a dragging operation, a pressing operation at a large area, a pressing operation with a heavy touch force, a touching operation along a specified trajectory, or a knuckle touching operation. When the terminal determines that the received human-computer interaction operation matches a preset human-computer interaction operation, the call-out instruction associated with the preset human-computer interaction operation is generated. Such call-out instruction is used to display the system sidebar.

The system sidebar is a virtual container provided by an operating system in the terminal. The virtual container is used to place contents including operable controls and/or information. In some implementations, the information may include at least one of text, an image, a video or audio.

Exemplarily, the system sidebar may be displayed at a left edge of the display screen, or a right edge of the display screen.

At operation 330, in response to a trigger operation performed on the to-be-processed data, a second graphical user interface of the first application is displayed, where the second graphical user interface is an interface for processing the to-be-processed data.

In the exemplary embodiments of the disclosure, after displaying the sidebar, the operating system may respond to the trigger operation performed on the to-be-processed data, and display the second graphical user interface of the first application. It is notable that, in a case where the operating system can display the second graphical user interface when the to-be-processed data in the system sidebar is triggered, an efficiency of opening the second graphical user interface by the user is improved, and the description is as follows.

In the related art, a process of switching, by the terminal, the displaying from the first graphical user interface of the first application to the second graphical user interface includes operations as follows. The first graphical user interface is first displayed on the display screen, and then the user actively looks, in the first graphical user interface, for a page entry to open the second graphical user interface. After the user clicks the page entry, the terminal would switch to the second graphical user interface. Thereafter, the user inputs the to-be-processed data to a relevant information input interface of the second graphical user interface.

However, in the exemplary embodiments of the disclosure, the terminal is enabled to push the to-be-processed data in the background automatically. On the premise of not changing the first user graphical interface, the to-be-processed data is displayed in the system sidebar; and when the to-be-processed data is triggered by a user, the second graphical user interface can be opened directly, thereby improving an operating efficiency.

Based on the above, in the exemplary embodiments, when the first graphical user interface of the first application is displayed, the system sidebar can be displayed in the edge area of the display screen, where the system sidebar displays the to-be-processed data that is recommended for the first application. When there is a trigger operation performed on the to-be-processed data, the second graphical user interface of the first application can be displayed in response to the trigger operation, where the second graphical user interface is the interface for processing the to-be-processed data. In the exemplary embodiments of the disclosure, since the first graphical user interface and the to-be-processed data in the system sidebar may be displayed at the same time, the user can trigger the to-be-processed data in the system sidebar directly while viewing the first graphical user interface, which facilitates the quick displaying of the second graphical user interface for processing the to-be-processed data, thereby improving an auxiliary effect of the system sidebar on the currently displayed application.

In some implementations, the to-be-processed data includes a file.

The operation of displaying the second graphical user interface of the first application in response to the trigger operation performed on the to-be-processed data, includes:

in response to the trigger operation performed on the file, displaying the second graphical user interface of the first application, where the second graphical user interface is a file viewing interface or a file editing interface on which the file has been loaded.

In some implementations, the operation of displaying the system sidebar in the edge area of the display screen, includes:

querying, based on a file format supported by the first application, the operating system for a file conforming to the file format; and displaying the system sidebar in the edge area of the display screen, with the file conforming to the file format being displayed in the system sidebar.

In some implementations, the first application is a document editing application, and the file is a document file; the first application is a spreadsheet editing application, and the file is a spreadsheet file; the first application is a slide editing application, and the file is a slide file; the first application is a multimedia editing application, and the file is at least one of a video or audio; or the first application is an application that supports code scanning, and the file is a graphic code file.

In some implementations, the to-be-processed data includes a character string.

The operation of displaying the second graphical user interface of the first application in response to the trigger operation performed on the to-be-processed data, includes:

in response to the trigger operation performed on the character string, displaying the second graphical user interface of the first application, where the second graphical user interface is a user interface obtained by parsing and processing information carried in the character string.

In some implementations, the operation of displaying the system sidebar in the edge area of the display screen, includes:

querying, based on a coded format supported by the first application, a clipboard for a character string conforming to the coded format; and displaying the system sidebar in the edge area of the display screen, with the character string conforming to the coded format being displayed in the system sidebar.

In some implementations, the first application is a shopping application, and the character string includes a link to a product; the first application is an address book application, and the character string includes at least one of a communication number, an email address, or a social account; or the first application is a map application or a car-hailing application, and the character string includes location information.

In some implementations, the method further includes:

displaying an in-app object in the system sidebar, where the in-app object is information or a sub-application provided by the first application.

In some implementations, displaying the in-app object in the system sidebar includes:

displaying a startup icon in the system sidebar, where the startup icon is used to launch the sub-application of the first application; or displaying an information list in the system sidebar, where the information list is used to display at least two pieces of information; or in response to the first application being a shopping application, displaying a product browsing history in the system sidebar; or displaying, in the system sidebar, contact information in the first application; or in response to the first application being an office application, displaying at least one of a background template, an image, a text, audio or a video in the system sidebar; or in response to the first application being a social application, displaying, in the system sidebar, a page entry for a blog in the social application; or in response to the first application being a financial management application, displaying at least one of asset information, a bill, or a payment code in the system sidebar.

In some implementations, the method further includes:

displaying service progress information in the system sidebar, where the service progress information is used to indicate a status of a service in progress and the service progress information is dynamically updated.

In some implementations, displaying the service progress information in the system sidebar, includes:

acquiring a display direction of the system sidebar; determining a bottom area of the system sidebar based on the display direction of the system sidebar; and displaying the service progress information in the bottom area; or acquiring a touch point for a call-out instruction; and displaying the service progress information based on a location of the touch point, where the call-out instruction is used to call out the system sidebar.

In some implementations, the method further includes:

displaying a voice assistant button in the system sidebar, where the voice assistant button is used to initiate voice assistant when the voice assistant button is triggered.

Based on the solution disclosed in the previous embodiments, different implementation schemes may be applied to the terminal, according to different to-be-processed data. When the to-be-processed data includes the file, please refer to the following embodiments.

Referring to FIG. 4, FIG. 4 is another schematic flowchart of the method for displaying a sidebar according to some exemplary embodiments of the disclosure. The method for displaying a sidebar may be applied to the above described terminal. In FIG. 4, the method for displaying a sidebar includes operations as follows.

At operation 401, a first graphical user interface of a first application is displayed.

In the disclosure, the execution process of operation 401 is the same as that of operation 310, and details thereof will not be repeated here.

At operation 402, based on a file format supported by the first application, the operating system is queried for a file conforming to the file format.

In some implementations, the terminal may determine file formats supported by the first application. In a possible implementation, the operating system in the terminal may identify an installation package of the first application when the first application is installed. Thereafter, the operating system determines, by querying a cloud database, the file format supported by the first application, and saves the file format locally. In another possible implementation, the operating system in the terminal does not usually save the file format supported by the first application in advance. When the operating system is required to determine the file format supported by the first application, the operating system determines the file format supported by the first application through the cloud database.

It is notable that both the above two implementations are solutions that can be implemented in practice. In the first implementation, the data is stored locally, so that the terminal in an offline state can implement the sidebar display solution provided by the disclosure. In the second implementation, the data is stored in a cloud server, and the data is acquired from the cloud server in real time when the operating system needs the data, thereby saving a local storage space.

After determining the file format supported by the first application, the terminal can query the operating system for a file conforming to the file format. It is notable that, the operating system in the disclosure has an authority to access all files, and performs a matching operation among the accessible files to determine the file(s) conforming to the specified file format.

It is notable that, due to a limited display space of the system sidebar, the terminal may further sort the files by importance after determining the files conforming to the file format. A criteria for sorting the files by importance may include a last modification time or the number of accesses.

In a possible implementation, when the criteria for sorting the files by importance is the last modification time, the terminal may preferentially display, in the system sidebar, a file whose last modification time is closest to a current system time among the files conforming to the file format.

In another possible implementation, when the criteria for sorting the files by importance is the number of accesses, the terminal may preferentially display, in the system sidebar, a file with the largest number of accesses among the files conforming to the file format.

At operation 403, the system sidebar is displayed in the edge area of a display screen, with the file conforming to the file format being displayed in the system sidebar.

In the exemplary embodiments of the disclosure, the terminal may display the system sidebar in the edge area of the display screen. It is noted that, the edge area may be an area located at the edge of the display screen as pre-designed by a designer. In a possible implementation, when the display screen is rectangular or approximately rectangular, the terminal may take an elongated area close to a side of the display screen as the edge area.

For example, the terminal may take an elongated area with a width of 500 pixels that is close to an edge of the display screen as the edge area. In another possible design, the terminal may take an area that is close to an edge of the display screen and occupies a specified percentage of a width of the display screen, as the edge area. For example, the terminal takes an elongated area that is close to a right edge of the display screen and has a width accounting for 30% of the total width, as the edge area. Alternatively, the terminal takes an elongated area that is close to a left edge of the display screen and has a width accounting for 30% of the total width, as the edge area.

In the exemplary embodiments of the disclosure, the terminal may display the system sidebar in the edge area. The system sidebar may be called out for display in response to the user's instruction. In another possible implementation, the system sidebar may also be an area constantly displayed on the terminal's display screen, and the system sidebar does not change with a change of the first user interface.

Referring to FIG. 5, FIG. 5 is a schematic diagram illustrating displaying of a system sidebar based on the embodiments illustrated in FIG. 4. In a display state 510, the system sidebar 210 of the terminal is constantly displayed on the display screen. Regardless of whether the user interface displayed on the terminal is a desktop interface or a user interface of a common application, the system sidebar 210 would always be displayed. Specifically, in such display state, when the application enters a full-screen user interface, the terminal may hide the system sidebar 210. In some implementations, the user may also control whether to constantly display the system sidebar 210. When a hold button for the system sidebar resident is triggered, the terminal controls the system sidebar to be constantly displayed on the display screen. A form of the triggered hold button may refer to a button 511 in FIG. 5.

In a display state 520, the system sidebar 210 of the terminal may be constantly displayed on the display screen in response to receiving the user's call-out instruction, and may be closed in response to receiving a user's close operation. An unhold state of the hold button may refer to a button 521 in FIG. 5.

At operation 404, in response to the trigger operation performed on the file, the second graphical user interface of the first application is displayed, where the second graphical user interface is a file viewing interface or a file editing interface on which the file has been loaded.

In a possible implementation, the terminal may display the file through the second graphical user interface.

In this example, the file may be a file that can be viewed, including at least one of a document file, a spreadsheet file, a slide file, an image file, a video file, an audio file, or a mail file.

In another possible implementation, the terminal may display a file editing interface for editing a file, through the second graphical user interface.

In this example, the file may be a file that can be edited, including at least one of a document file, a spreadsheet file, a slide file, an image file, a video file, an audio file, or a mail file.

In a specific implementation, the terminal may display a corresponding second graphical user interface in the following manners which are described as follows.

In a first example, the first application is a document editing application, and the file is a document file.

Referring to FIG. 6, FIG. 6 illustrates a user interface on which a document editing application and a sidebar are simultaneously displayed according to some embodiments of the disclosure. In FIG. 6, the first application is a document editing application named notebook. An editing interface for the document file, titled "Creating a Comfortable Space", is displayed in the second graphical user interface 6A. A document file 1, a document file 2 and a document file 3, which are recently opened, are displayed in the system sidebar 210. That is, when the first graphical user interface is switched to the second graphical user interface, the system sidebar is retained in the edge area. Exemplarily, the system sidebar 210 may further display a voice assistant button 214 and an application recommendation area, where a first background 601, a second background 602, a third background 603, and a fourth background 604 are displayed in the application recommendation area. In addition, the terminal displays first service progress information 605 and second service progress information 606 in an efficient tool area. In FIG. 6, the first service progress information 605 is used to indicate a current recording progress. The second service progress information 606 is used to indicate a current taxi progress.

In some implementations, the system sidebar 210 may further display applications frequently used by the user, such as a frequently used social application 607, a frequently used game 608, a frequently used shopping application 609, a first frequently used video software 610, a second frequently used video software 611, and a frequently used office software 612.

In a second example, the first application is a spreadsheet editing application, and the file is a spreadsheet file.

Similar to the user interface illustrated in FIG. 6, the second graphical user interface displays the spreadsheet file. The system sidebar displays multiple spreadsheet files recommended by the operating system, rather than the document files illustrated in FIG. 6. In addition to the above difference, for contents involved in the user interface when the first application is the spreadsheet editing application, reference may be made to the user interface illustrated in FIG. 6.

In a third example, the first application is a slide editing program, and the file is a slide file.

Similar to the user interface illustrated in FIG. 6, the second graphical user interface displays the slide file. The system sidebar displays multiple slide files recommended by the operating system, rather than the document files illustrated in FIG. 6. In addition to the above difference, for contents involved in the user interface when the first application is the slide editing application, reference may be made to the user interface illustrated in FIG. 6.

In a fourth example, the first application is a multimedia editing application, and the file is at least one of a video or audio.

Similar to the user interface illustrated in FIG. 6, the second graphical user interface displays a user interface for editing the video or the audio. The system sidebar displays multiple editable videos or audio recommended by the operating system, rather than the document files illustrated in FIG. 6. In addition to the above difference, for contents involved in the user interface when the first application is the multimedia editing application, reference may be made to the user interface illustrated in FIG. 6.

In a fifth example, the first application is an application that supports code scanning, and the file is a graphic code file.

In this example, the first application is the application that supports code scanning. The graphic code file herein may be any file such as a bar code, a two-dimensional code, or a graphic code. The graphic code is displayed in the system sidebar, and the second graphical user interface shows a page obtained by scanning the graphic code.

To sum up, in the exemplary embodiments, when the to-be-processed data displayed in the system sidebar is a file, based on the file format supported by the first application, the file that conforms to the file format in the operating system may be determined and displayed in the system sidebar. When the file is triggered, the file viewing interface or the file editing interface on which the file has been loaded is displayed in the second image user interface of the first application, thereby improving an efficiency of viewing the file by a user, or improving an efficiency of opening the to-be-edited file by a user.

Based on the solution disclosed in the previous embodiments, different implementation schemes may be applied to the terminal, according to different to-be-processed data. When the to-be-processed data includes the character string, please refer to the following embodiments.

Referring to FIG. 7, FIG. 7 is yet another schematic flowchart of the method for displaying a sidebar according to some exemplary embodiments of the disclosure. The method for displaying a sidebar may be applied to the above described terminal. In FIG. 7, the method for displaying a sidebar includes operations as follows.

At operation 701, a first graphical user interface of a first application is displayed.

In the disclosure, the execution process of operation 701 is the same as that of operation 310, and details thereof will not be repeated here.

At operation 702, based on a coded format supported by the first application, a clipboard is queried for a character string conforming to the coded format.

In some implementations, the terminal may determine the coded format supported by the first application. The supported coded format includes a coded format that can be parsed by the first application. In a possible implementation, the coded format may be a coded format with a specified keyword. For example, the terminal may process a coded format including a specified field herf//. It is notable that the specified field may be any character string that can be implemented.

Exemplarily, the clipboard used in the disclosure may be a system clipboard provided by the operating system. The system clipboard provided by the operating system may be used to store a text, and may also be used to store other contents. For example, the system clipboard may also include an image, an audio, or a video.

In the embodiments of the disclosure, the text in the clipboard is queried for the corresponding character string.

At operation 703, the system sidebar is displayed in an edge area of a display screen, with the character string conforming to the coded format being displayed in the system sidebar.

In the exemplary embodiments of the disclosure, the character string conforming to the coded format may be directly displayed in the system sidebar. In a possible display manner, the character string conforming to the coded format may be completely displayed in the system sidebar. In another possible display manner, a part of the character string conforming to the coded format may be displayed in the system sidebar, and a remaining part of the character string is hidden, so as to avoid too much space from being occupied in the system sidebar.

At operation 704, in response to a trigger operation performed on the character string, a second graphical user interface of the first application is displayed, where the second graphical user interface is a user interface obtained by parsing and processing information carried in the character string.

In the exemplary embodiments of the disclosure, the user's trigger operation may be performed on the character string in the system sidebar. The trigger operation may include a clicking operation, a long pressing operation, or a pressing operation with a heavy touch force, etc. In response to the trigger operation performed on the character string, the terminal displays the second graphical user interface of the first application. It is notable that, the second graphical user interface is a user interface obtained by parsing and processing information carried in the character string. Specifically, the first application can parse the information carried in the character string, and the first application parses and processes the information carried in the character string to obtain a user interface as the second graphical user interface.

It is notable that, the second graphical user interface may be displayed in multiple display manners. In a possible manner, the second graphical user interface and the first graphical user interface are displayed in a split screen manner. In another possible manner, the second graphical user interface is displayed in a full-screen manner. In yet another possible manner, the second graphical user interface is displayed in a floating window on the first graphical user interface.

In a specific implementation, the terminal may display the corresponding second graphical user interface in the following manners described as follows.

In a first example, the first application is a shopping application, and the character string includes a link to a product.

Figure 8:
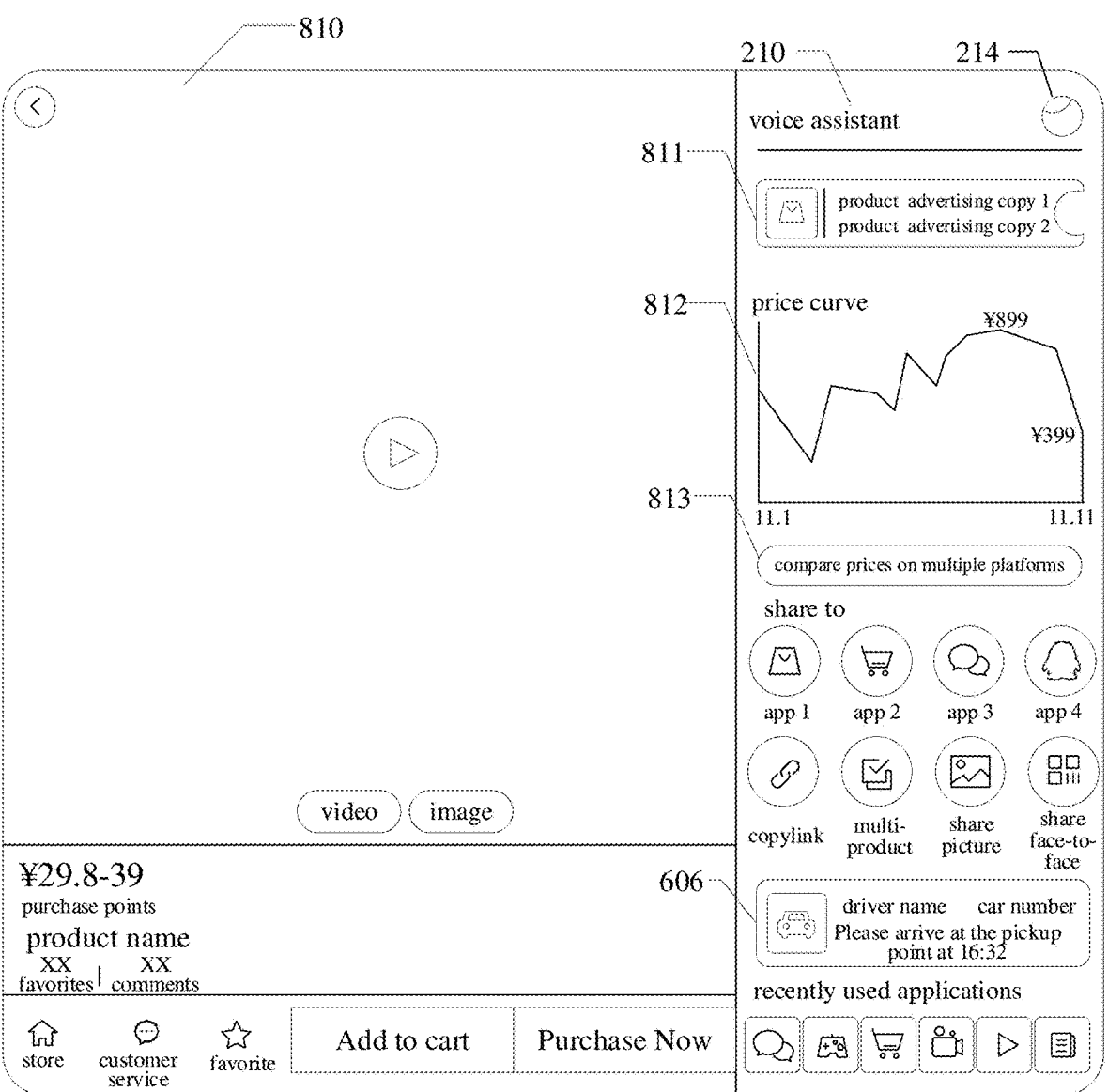
FIG. 8 illustrates a user interface of a shopping application based on the embodiments illustrated in FIG. 7.

In the exemplary embodiments of the disclosure, when the first application is the shopping application, the character string may include the link to the product. It is notable that, after the link to the product is clicked, the link to the product may no longer be displayed in the system sidebar, and other contents related to the product may be displayed in the system sidebar. For example, FIG. 8 illustrates a user interface of a shopping application based on the embodiments illustrated in FIG. 7. As illustrated in FIG. 8, an interface of product details is displayed in the second graphical user interface 810. The displayed main contents include the product's introduction video and image. The displayed contents may include the product's price, name, promotions, sale volume, and collection, which are displayed under the product's introduction video and image. In addition, the second graphical user interface 810 may further display a purchase button, an add to cart button, a store home button, a customer service button, and a favorite button.

Contents strongly related to the currently displayed second graphical user interface, such as a voice assistant button 214, a coupon control 811, a price trend chart 812, and a price comparison button 813, are displayed in the system sidebar 210. That is, the second graphical user interface and the system sidebar are displayed at the same time. In addition, the terminal may further display a sharing control. For example, eight sharing controls are illustrated in FIG. 8, which are buttons for sharing to application 1, application 2, application 3, or application 4, a copy link control, a button for comparing prices of multiple products, a pictorial sharing control, and a face-to-face sharing control.

Exemplarily, the link to the product may be a link that is able to be parsed by only the shopping application. In practice, the link to the product may also be referred to as a merchandise mnemonic, which is not limited in the embodiments of the disclosure.

In addition, second service progress information 606 is displayed in FIG. 8. The second service progress information 606 is used to indicate a current taxi progress. Furthermore, a startup icon for recently used applications may be displayed in FIG. 8. In response to such startup icon being triggered, the terminal launches a corresponding application.

In a second example, the first application is an address book application, and the character string includes at least one of a communication number, an email address, or a social account.

In this example, when the first application is the address book application, the operating system takes at least one of the communication number, the email address, or the social account as the character string of the disclosure for processing. In response to a user clicking on a string character in the system sidebar, the terminal automatically creates corresponding contact information in the second graphical user interface and fills the character string into a corresponding position.

In a third example, the first application is a map application or a car-hailing application, and the character string includes location information.

In this example, when the first application is the map application or the car-hailing application, the character string displayed in the system sidebar includes the location information. In practice, the operating system may establish a location library in advance. Based on the location library, the operating system may be enabled to recognize locations.

An in-app object may be displayed in the system sidebar of the exemplary embodiments of the disclosure, where the in-app object is information or a sub-application provided by the first application. In a possible implementation, the in-app object may be information, which may be displayed in a form of a news push or in a form of a list.

In another possible implementation, the in-app object may also be a sub-application. In practice, the sub-application may be an applet of the application, such as an applet integrated in a social chat application, or an applet integrated in a payment application.

With regard to the in-app object, the operating system may determine different contents of the in-app object for different first applications, which is described as follows.

In a first example, a startup icon of the sub-application may be directly displayed in the system sidebar, and the startup icon is used to launch the sub-application of the first application after the startup icon is triggered.

It is notable that, the permission of developing the sub-applications in the first application may be opened by the owner of the first application to other companies or groups.

In a second example, an information list may be displayed in the system sidebar, and at least two pieces of information are displayed in the information list. It is notable that, when the first application is a news application or a knowledge-based application that provides contents, the information list provided by such application may be displayed in the system sidebar.

In some implementations, the information list includes, but is not limited to, a popular search list or a popular news list.

In a third example, in response to the first application being a shopping application, a product browsing history is displayed in the system sidebar, so that the user can quickly recall browsed products to perform a related operation.

In a fourth example, the terminal may display contact information in the first application in the system sidebar.

In the exemplary embodiments of the disclosure, when the first application has a social function and is capable of adding information, for example, adding a contact to a buddy list, the contact information in the first application may be displayed in the system sidebar.

In a fifth example, in response to the first application being a social application, the terminal can display, in the system sidebar, a page entry for a blog in the social application. In response to the page entry being triggered, the terminal would display the blog in the social application.

In a sixth example, in response to the first application being a financial management application, at least one of asset information, a bill, or a payment code in the financial management application may be displayed in the system sidebar.

Considering the above six examples, the information of the in-app objects needs to be provided to the operating system by the first application, and after the operating system gets the corresponding information of the in-app objects through a preset data interface, the operating system generates a corresponding content and display the generated content in the system sidebar.

In another display manner of the disclosure, service progress information may also be displayed in the system sidebar, where the service progress information is used to indicate a status of a service in progress and the service progress information is dynamically updated. In a possible implementation, the service progress information may be updated through a trigger operation or periodically updated.

When the service progress information is updated through a trigger operation, the terminal updates the service progress information, in response to the user clicking the area where the service progress information is displayed.

When the service progress information is periodically updated, the terminal updates the service progress information based on an updating cycle.

In the exemplary embodiments of the disclosure, with respect to a display location of the service progress information in the system sidebar, there may be two display manners as follows.

In a possible display manner for the service progress information, the terminal acquires a display direction of the system sidebar, determines a bottom area of the system sidebar based on the display direction of the system sidebar, and displays the service progress information in the bottom area.

In another display manner for the service progress information, the terminal acquires a touch point for a call-out instruction; and displays the service progress information based on a location of the touch point, where the call-out instruction is used to call out the system sidebar.

Exemplarily, the system sidebar is further used to display a voice assistant button, which button is used to initiate a voice assistant when the voice assistant button is triggered.

Based on the above, in the method for displaying a sidebar provided by the exemplary embodiments of the disclosure, when the to-be-processed data includes the character string and the character string is triggered, the second graphical user interface of the first application may be displayed, where the second graphical user interface is the user interface obtained by parsing and processing information carried in the character string. In this scenario, the first application can intelligently and quickly open the second graphical user interface that has a high possibility of being opened by the user, improving an ability of the system sidebar of being efficient for different applications.

In some implementations, the system sidebar may also display the sub-application or information in the application, to expand the displayed content information of the application, thereby facilitating the user to access to important information in the application quickly.

In some implementations, the voice assistant may also be displayed in the system sidebar, so that the user can quickly call out the voice assistant to control the terminal through voice.

In some implementations, the system sidebar may also display the service progress information, so that the system sidebar may display the status of the service currently in progress, which improves an efficiency of acquiring the status of the service in progress by the user.

Exemplarily, the displayed contents in the system sidebar in the exemplary embodiments of the disclosure will be described through multiple implementation schemes as follows.

Figure 9:
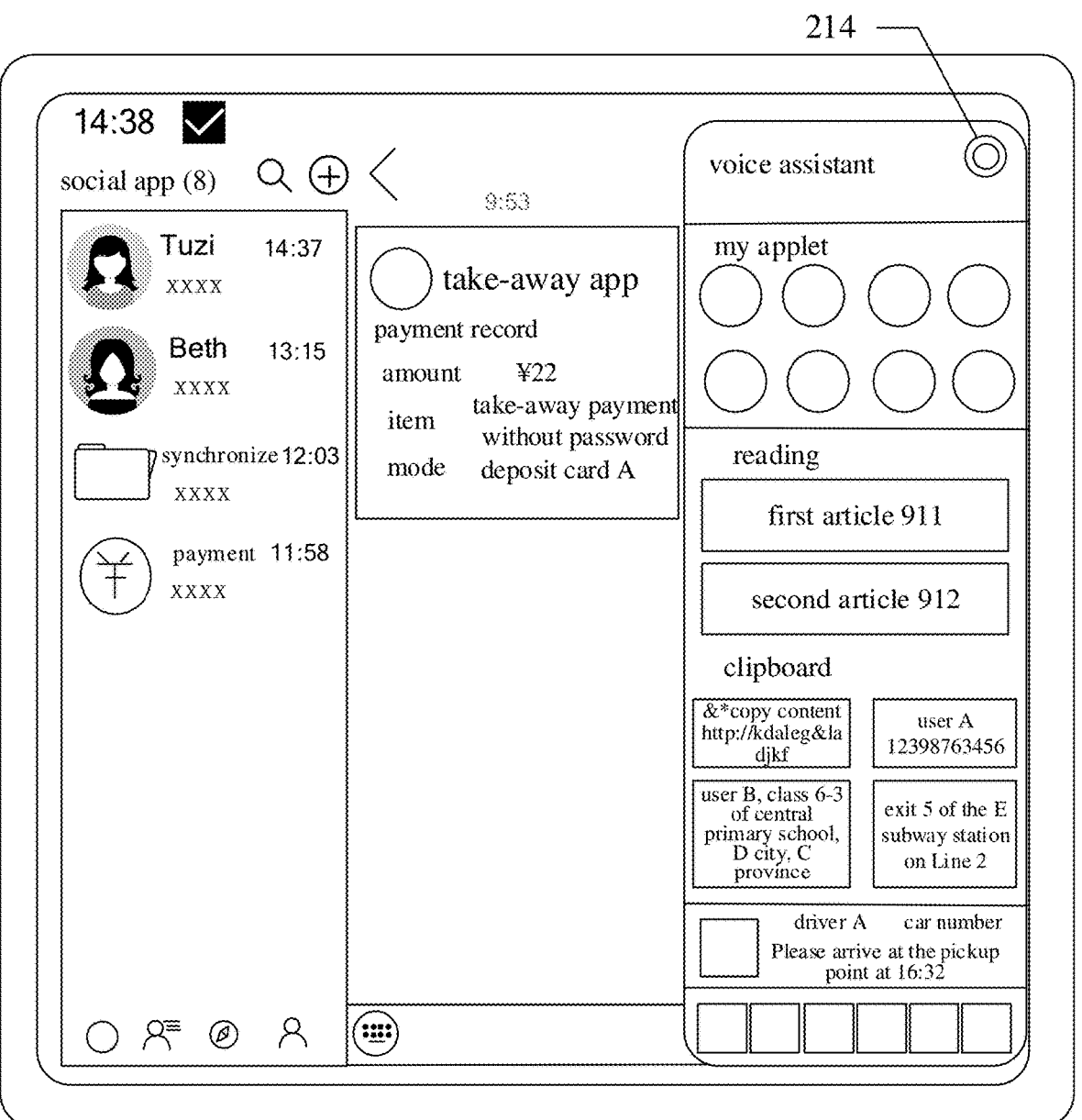
FIG. 9 illustrates a user interface on which a social application and a system sidebar are simultaneously displayed according to some embodiments of the disclosure.

Referring to FIG. 9, FIG. 9 illustrates a user interface on which a social application and a system sidebar are simultaneously displayed according to some embodiments of the disclosure. As illustrated in FIG. 9, a chat interface of the social application is displayed. The contents displayed in the system sidebar include a voice assistant button 214, an applet icon, a first article 911 and a second article 912 that are being read. It is notable that both the first article 911 and the second article 912 belong to pages in the social application.

The terminal may also display contents of a system clipboard in the system sidebar. In addition, the terminal may also display, in the system sidebar, a taxi service in progress and several applications that are frequently used by the user.

Figure 10:
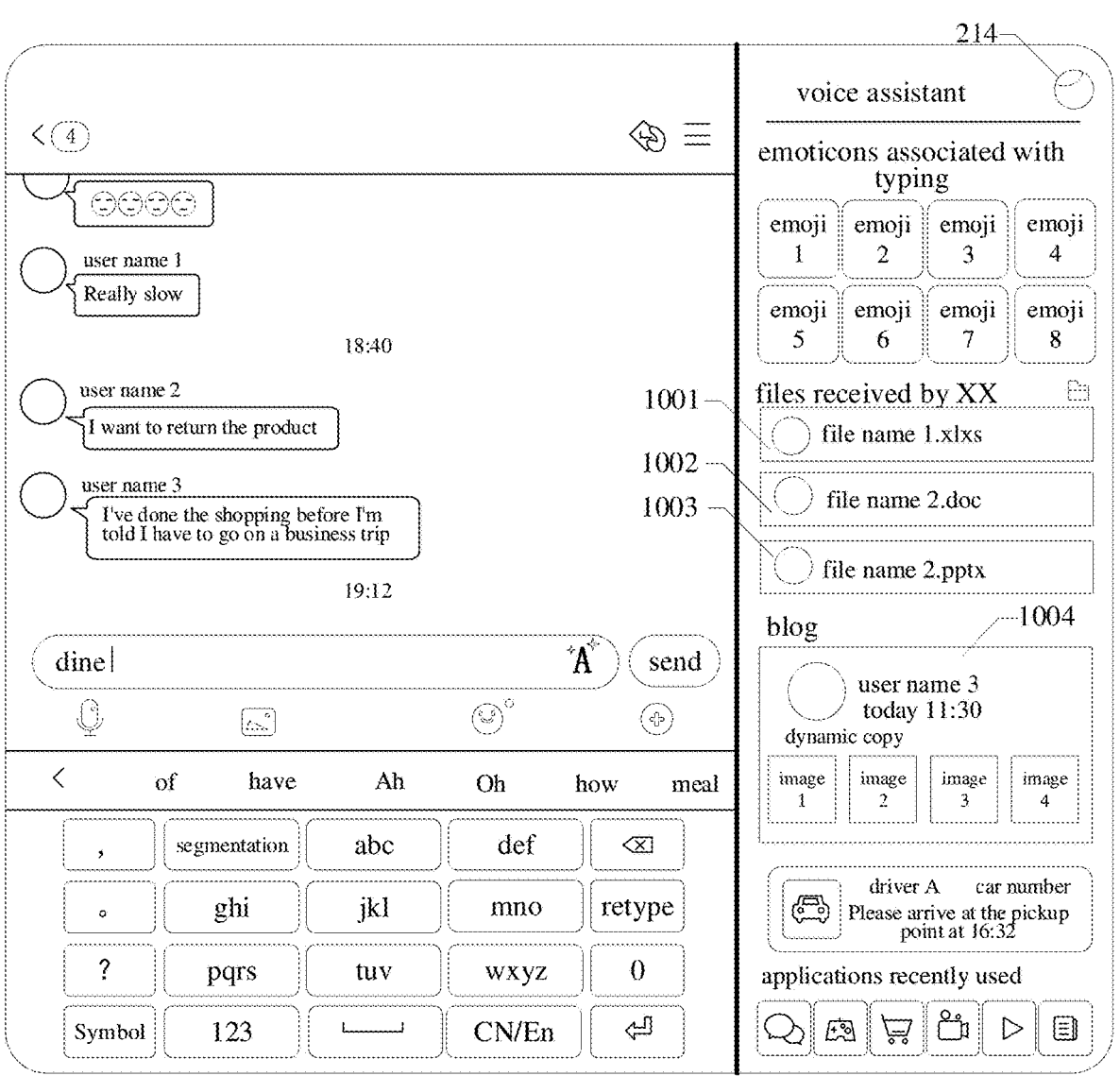
FIG. 10 illustrates a user interface on which another social application and a system sidebar are simultaneously displayed according to some embodiments of the disclosure.

Referring to FIG. 10, FIG. 10 illustrates a user interface on which another social application and a system sidebar are simultaneously displayed according to some embodiments of the disclosure. As illustrated in FIG. 10, a chat interface of the social application is displayed. The contents displayed in the system sidebar include: a voice assistant button 214; typing association emoticons; a spreadsheet file 1001, a document file 1002, and a slide file 1003 that are received by the social application; and blog content 1004.

The terminal may also display contents of the system clipboard in the system sidebar. In addition, the terminal may also display, in the system sidebar, a taxi service in progress and several applications that are frequently used by the user.

Figure 11:
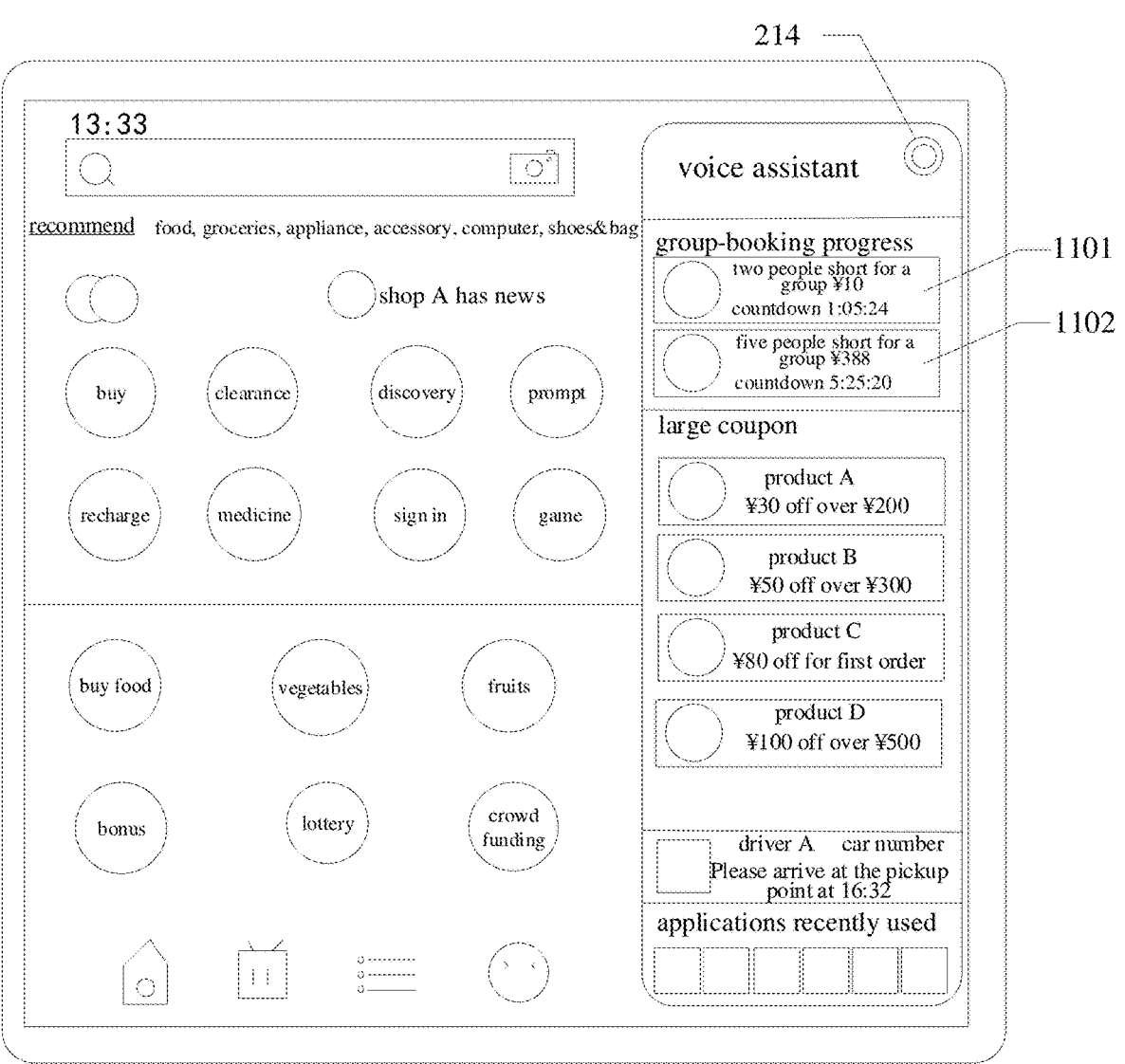
FIG. 11 illustrates a user interface on which a shopping application and a system sidebar are simultaneously displayed according to some embodiments of the disclosure.

Referring to FIG. 11, FIG. 11 illustrates a user interface on which a shopping application and a system sidebar are simultaneously displayed according to some embodiments of the disclosure. As illustrated in FIG. 11, a main page of the shopping application is displayed. The terminal displays a first group-booking progress message 1101 and the second group-booking progress message 1102 in the system sidebar. In addition, the terminal displays four different coupons included in a coupon bar.

The terminal may also display contents of the system clipboard in the system sidebar. In addition, the terminal may also display, in the system sidebar, a taxi service in progress and several applications that are frequently used by the user.

Figure 12:
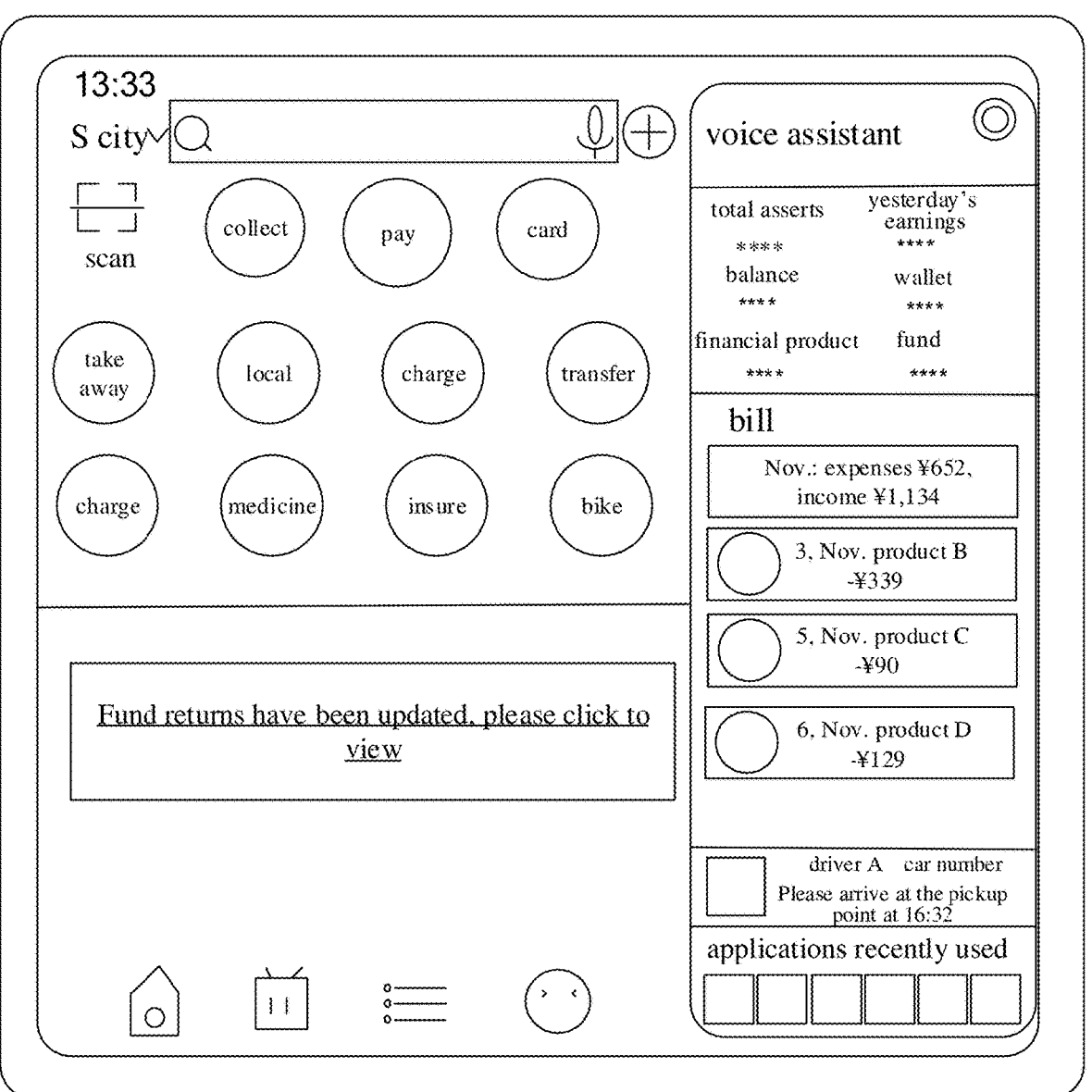
FIG. 12 illustrates a user interface on which a financial management application and a system sidebar are simultaneously displayed according to some embodiments of the disclosure.

Referring to FIG. 12, FIG. 12 illustrates a user interface on which a financial management application and a system sidebar are simultaneously displayed according to some embodiments of the disclosure. As illustrated in FIG. 12, a main page of the financial management application is displayed. The terminal may display asset information, a bill and frequent contacts in the system sidebar. The asset information and the bill are in-app objects, and the frequent contacts may also be information provided by financial management application.

The terminal may also display contents of the system clipboard in the system sidebar. In addition, the terminal may also display, in the system sidebar, a taxi service in progress and several applications that are frequently used by the user.

Referring to FIG. 13, FIG. 13 illustrates a user interface on which an in-app game provided by the financial management application and the system sidebar are simultaneously displayed according to some embodiments of the disclosure. As illustrated in FIG. 13, a payment QR code, frequent contacts, and applets in the financial management program are displayed in the system sidebar.

The terminal may also display contents of the system clipboard in the system sidebar. In addition, the terminal may also display, in the system sidebar, a taxi service in progress and several applications that are frequently used by the user.

Apparatus embodiments of the disclosure are described as follows, and an apparatus described herein can implement the method embodiments of the disclosure. For details not disclosed in the apparatus embodiments of the disclosure, reference is made to the method embodiments of the disclosure.

Referring to FIG. 14, FIG. 14 illustrates a structural block diagram of an apparatus for displaying a sidebar according to some exemplary embodiments of the disclosure. The apparatus for displaying a sidebar may be implemented as all or a part of the terminal through software, hardware or a combination of the two. The apparatus includes:

a first interface displaying module 1410, configured to display a first graphical user interface of a first application;

a sidebar displaying module 1420, configured to display a system sidebar in an edge area of a display screen, with to-be-processed data recommended for the first application is displayed in the system sidebar; and a second interface displaying module 1430, configured to:
in response to a trigger operation performed on the to-be-processed data, display a second graphical user interface of the first application, where the second graphical user interface is an interface for processing the to-be-processed data.

In some alternative embodiments, the to-be-processed data involved in the apparatus includes a file, and the second interface displaying module 1430 is further configured to: in response to the trigger operation performed on the file, display the second graphical user interface of the first application, where the second graphical user interface is a file viewing interface or a file editing interface on which the file has been loaded.

In some alternative embodiments, the sidebar displaying module 1420 is further configured to: query, based on a file format supported by the first application, an operating system for a file conforming to the file format; and display the system sidebar in the edge area of the display screen, with the file conforming to the file format being displayed in the system sidebar.

In some alternative embodiments, the first application is a document editing application, and the file is a document file; alternatively, the first application is a spreadsheet editing application, and the file is a spreadsheet file; alternatively, the first application is a slide editing application, and the file is a slide file; alternatively, the first application is a multimedia editing application, and the file is at least one of a video or audio; alternatively, the first application is an application that supports code scanning, and the file is a graphic code file.

In some alternative embodiments, the to-be-processed data involved in the apparatus include a character string, and the second interface displaying module 1430 is further configured to: in response to the trigger operation performed on the character string, display a second graphical user interface of the first application, where the second graphical user interface is a user interface obtained by parsing and processing information carried in the character string.

In some alternative embodiments, the sidebar displaying module 1420 is further configured to: query, based on a coded format supported by the first application, a clipboard for a character string conforming to the coded format; and display the system sidebar in the edge area of the display screen, with the character string conforming to the coded format being displayed in the system sidebar.

In some alternative embodiments, the first application is a shopping application, and the character string includes a link to a product; alternatively, the first application is an address book application, and the character string includes at least one of a communication number, an email address, or a social account; alternatively, the first application is a map application or a car-hailing application, and the character string includes location information.

In some alternative embodiments, the apparatus further includes an object displaying module configured to display an in-app object in the system sidebar, where the in-app object is information or a sub-application provided by the first application.

In some alternative embodiments, the object displaying module is further configured to: display a startup icon in the system sidebar, where the startup icon is used to launch the sub-application of the first application; display an information list in the system sidebar, where the information list is used to display at least two pieces of information; in response to the first application being a shopping application, display a product browsing history in the system sidebar; display, in the system sidebar, contact information in the first application; in response to the first application being an office application, display at least one of a background template, an image, a text, audio or a video in the system sidebar; in response to the first application being a social application, display, in the system sidebar, a page entry for a blog in the social application; or in response to the first application being a financial management application, display at least one of asset information, a bill, or a payment code in the system sidebar.

In some alternative embodiments, the apparatus further include a progress displaying module configured to display service progress information in the system sidebar, where the service progress information is used to indicate a status of a service in progress and the service progress information is dynamically updated.

In some alternative embodiments, the progress displaying module is further configured to: acquire a display direction of the system sidebar, determine a bottom area of the system sidebar based on the display direction of the system sidebar, and display the service progress information in the bottom area. Alternatively, the progress displaying module is further configured to: acquire a touch point for a call-out instruction, and display the service progress information based on a location of the touch point, where the call-out instruction is used to call out the system sidebar.

In some alternative embodiments, the apparatus further include a voice assistant displaying module configured to display a voice assistant button in the system sidebar, where the voice assistant button is used to initiate a voice assistant when the voice assistant button triggered.

Based on the above, in the apparatus for displaying a sidebar according to the embodiments of the disclosure, when the to-be-processed data includes the character string and the character string is triggered, the apparatus can display the second graphical user interface of the first application, where the second graphical user interface is the user interface obtained by parsing and processing information carried in the character string. In this scenario, the first application can intelligently and quickly open the second graphical user interface that has a high possibility of being opened by the user, improving the ability of the system sidebar of being efficiency for different applications.

In some alternative embodiments, when the to-be-processed data displayed in the system sidebar is a file, based on the file format supported by the first application, the file that conforms to the file format in the operating system may be determined and displayed in the system sidebar. When the file is triggered, the file viewing interface or the file editing interface on which the file has been loaded is displayed in the second image user interface of the first application, thereby improving the efficiency of viewing the file by a user, or improving the efficiency of opening the to-be-edited file by a user.

The embodiments of the disclosure further provide a computer-readable storage medium. The computer-readable storage medium stores at least one instruction which, when being loaded and executed by a processor, causes the method for displaying a sidebar according to the above embodiments to be implemented.

It is notable that, for the apparatus for displaying a sidebar provided by the foregoing embodiments performing the method for displaying a sidebar, the division of the foregoing functional modules is merely used for illustration. In practice, the above functions can be allocated to different functional modules as required, that is, the internal structure of the device can be divided into different functional modules to complete all or part of the functions described above. In addition, the above apparatus for displaying a sidebar provided by the apparatus embodiments and the method for displaying a sidebar of the method embodiments belong to the same concept, and the detailed realizing process of the apparatus embodiments refer to the method embodiments, which will not be repeated herein.

The above serial numbers of the embodiments are merely for description and do not represent advantages or disadvantages of the embodiments.

Those of ordinary skill in the art can understand that all or part of the operations in the foregoing embodiments can be achieved by hardware or by a program instructing related hardware. The program can be stored in a computer-readable storage medium. The storage medium may be a read-only memory, a magnetic disk, or an optical disk, etc.

The foregoing is merely exemplary embodiments that can be implemented by the disclosure and is not intended to limit the disclosure. Any modification, equivalent substitute, improvement, and the like, made within the spirit and principle of the disclosure shall be included in the protection scope of the disclosure.

What is claimed is:

1. A method for displaying a sidebar, wherein the method is implemented by a terminal, and the method comprises:

displaying a first graphical user interface of a first application on a display screen of the terminal;

displaying a system sidebar in an edge area of the display screen, wherein to-be-processed data recommended for the first application is displayed in the system sidebar; and in response to a trigger operation performed on the to-be-processed data, displaying a second graphical user interface of the first application, wherein the second graphical user interface is an interface for processing the to-be-processed data;

wherein the to-be-processed data comprises a character string, and displaying the system sidebar in the edge area of the display screen, comprises:

querying, based on a coded format supported by the first application, a clipboard for a character string conforming to the coded format; and displaying the system sidebar in the edge area of the display screen, wherein the character string conforming to the coded format is displayed in the system sidebar.

2. The method as claimed in claim 1, wherein the to-be-processed data further comprises a file; and wherein displaying the second graphical user interface of the first application in response to the trigger operation performed on the to-be-processed data, comprises:

in response to the trigger operation performed on the file, displaying the second graphical user interface of the first application, wherein the second graphical user interface is a file viewing interface or a file editing interface on which the file has been loaded.

3. The method as claimed in claim 2, wherein displaying the system sidebar in the edge area of the display screen, further comprises:

querying, based on a file format supported by the first application, an operating system for a file conforming to the file format; and displaying the system sidebar in the edge area of the display screen, wherein the file conforming to the file format is displayed in the system sidebar.

4. The method as claimed in claim 2, wherein the first application is a document editing application, and the file is a document file; or the first application is a spreadsheet editing application, and the file is a spreadsheet file; or the first application is a slide editing application, and the file is a slide file; or the first application is a multimedia editing application, and the file is at least one of a video or audio; or the first application is an application that supports code scanning, and the file is a graphic code file.

5. The method as claimed in claim 1, wherein displaying the second graphical user interface of the first application in response to the trigger operation performed on the to-be-processed data, comprises:

in response to the trigger operation performed on the character string, displaying the second graphical user interface of the first application, wherein the second graphical user interface is a user interface obtained by parsing and processing information carried in the character string.

6. The method as claimed in claim 1, wherein the first application is a shopping application, and the character string comprises a link to a product; or the first application is an address book application, and the character string comprises at least one of a communication number, an email address, or a social account; or the first application is a map application or a car-hailing application, and the character string comprises location information.

7. The method as claimed in claim 1, further comprising:

displaying an in-app object in the system sidebar, wherein the in-app object is information or a sub-application provided by the first application.

8. The method as claimed in claim 7, wherein displaying the in-app object in the system sidebar, comprises:

displaying a startup icon in the system sidebar, wherein the startup icon is used to launch the sub-application of the first application; or displaying an information list in the system sidebar, wherein the information list is used to display at least two pieces of information; or in response to the first application being a shopping application, displaying a product browsing history in the system sidebar; or displaying, in the system sidebar, contact information in the first application; or in response to the first application being an office application, displaying at least one of a background template, an image, a text, audio or a video in the system sidebar; or in response to the first application being a social application, displaying, in the system sidebar, a page entry for a blog in the social application; or in response to the first application being a financial management application, displaying at least one of asset information, a bill, or a payment code in the system sidebar.

9. The method as claimed in claim 1, further comprising:

displaying service progress information in the system sidebar, wherein the service progress information is used to indicate a status of a service in progress, and the service progress information is dynamically updated.

10. The method as claimed in claim 9, wherein displaying the service progress information in the system sidebar, comprises:

acquiring a display direction of the system sidebar, determining a bottom area of the system sidebar based on the display direction of the system sidebar, and displaying the service progress information in the bottom area; or acquiring a touch point for a call-out instruction, and displaying the service progress information based on a location of the touch point, wherein the call-out instruction is used to call out the system sidebar.

11. The method as claimed in claim 1, further comprising:

displaying a voice assistant button in the system sidebar, wherein the voice assistant button is used to initiate a voice assistant when the voice assistant button is triggered.

12. The method as claimed in claim 1, wherein displaying the second graphical user interface of the first application, comprises:

displaying the first graphical user interface and the second graphical user interface in a split screen manner;

displaying the second graphical user interface in full-screen manner; or displaying the second graphical user interface in a floating window on the first graphical user interface.

13. The method as claimed in claim 1, wherein displaying the second graphical user interface of the first application, comprises:

switching the first graphical user interface to the second graphical user interface, and retaining the system sidebar in the edge area.

14. The method as claimed in claim 1, wherein displaying the system sidebar in the edge area of the display screen, further comprises:

in response to a received human-computer interaction operation matching a preset human-computer interaction operation, generating a call-out instruction associated with the preset human-computer interaction operation, wherein the call-out instruction is used to display the system sidebar; and displaying the system sidebar in response to the call-out instruction, while the first graphical user interface of the first application is displayed.

15. A terminal, comprising a processor, a memory connected to the processor, and program instructions stored on the memory, wherein the program instructions, when being executed by the processor, causes a method for displaying a sidebar to be implemented, and the method comprises:

displaying a first graphical user interface of a first application on a display screen of the terminal;

displaying to-be-processed data recommended for the first application in a system sidebar on the display screen; and in response to a trigger operation performed on the to-be-processed data, displaying a second graphical user interface of the first application, wherein the second graphical user interface is an interface for processing the to-be-processed data; and wherein the method further comprises:

acquiring a display direction of the system sidebar, determining a bottom area of the system sidebar based on the display direction of the system sidebar, and displaying service progress information in the bottom area, wherein the service progress information is used to indicate a status of a service in progress, and the service progress information is dynamically updated; or acquiring a touch point for a call-out instruction, and displaying service progress information based on a location of the touch point, wherein the call-out instruction is used to call out the system sidebar, the service progress information is used to indicate a status of a service in progress, and the service progress information is dynamically updated.

16. The terminal as claimed in claim 15, wherein the to-be-processed data comprises a file; and wherein displaying to-be-processed data recommended for the first application in the system sidebar on the display screen of the terminal, comprises:

querying, based on a file format supported by the first application, an operating system for a file conforming to the file format; and displaying the system sidebar in an edge area of the display screen, wherein the file conforming to the file format is displayed in the system sidebar; and wherein displaying the second graphical user interface of the first application in response to the trigger operation performed on the to-be-processed data, comprises:

in response to the trigger operation performed on the file, displaying the second graphical user interface of the first application, wherein the second graphical user interface is a file viewing interface or a file editing interface on which the file has been loaded.

17. The terminal as claimed in claim 15, wherein the to-be-processed data comprises a character string; and wherein displaying to-be-processed data recommended for the first application in the system sidebar on the display screen of the terminal, comprises:

querying, based on a coded format supported by the first application, a clipboard for a character string conforming to the coded format; and displaying the system sidebar in an edge area of the display screen, wherein the character string conforming to the coded format is displayed in the system sidebar; and wherein displaying the second graphical user interface of the first application in response to the trigger operation performed on the to-be-processed data, comprises:

in response to the trigger operation performed on the character string, displaying the second graphical user interface of the first application, wherein the second graphical user interface is a user interface obtained by parsing and processing information carried in the character string.

18. A non-transitory computer-readable storage medium, wherein the computer-readable storage medium stores program instructions which, when being executed by a processor, causes a method for displaying a sidebar to be implemented, and the method comprises:

displaying both of a first graphical user interface of a first application and a system sidebar on a display screen of an electronic device, wherein to-be-processed data recommended for the first application is displayed in the system sidebar; and in response to a trigger operation performed on the to-be-processed data, displaying a second graphical user interface of the first application, wherein the second graphical user interface is an interface for processing the to-be-processed data;

wherein the to-be-processed data comprises a character string, and displaying the system sidebar on the display screen, comprises:

querying, based on a coded format supported by the first application, a clipboard for a character string conforming to the coded format; and displaying the system sidebar in an edge area of the display screen, wherein the character string conforming to the coded format is displayed in the system sidebar.

19. The non-transitory computer-readable storage medium as claimed in claim 18, wherein the method further comprises:

acquiring a display direction of the system sidebar, determining a bottom area of the system sidebar based on the display direction of the system sidebar, and displaying service progress information in the bottom area, wherein the service progress information is used to indicate a status of a service in progress, and the service progress information is dynamically updated; or acquiring a touch point for a call-out instruction, and displaying service progress information based on a location of the touch point, wherein the call-out instruction is used to call out the system sidebar, and the service progress information is used to indicate a status of a service in progress, and the service progress information is dynamically updated.

20. The non-transitory computer-readable storage medium as claimed in claim 18, wherein displaying the second graphical user interface of the first application in response to the trigger operation performed on the to-be-processed data, comprises:

in response to the trigger operation performed on the character string, displaying the second graphical user interface of the first application, wherein the second graphical user interface is a user interface obtained by parsing and processing information carried in the character string; and wherein the first application is a shopping application, and the character string comprises a link to a product; or the first application is an address book application, and the character string comprises at least one of a communication number, an email address, or a social account; or the first application is a map application or a car-hailing application, and the character string comprises location information.

* * * * *